Sept. 10, 1963

G. B. TICKTIN 3,103,660

BODY SUPPORTED TIME INTERVAL INDICATOR
WITH COLLAPSIBLE TIMING MEANS

Filed July 14, 1959

INVENTOR.
GEORGE B. TICKTIN

BY

ATTORNEYS

United States Patent Office 3,103,660
Patented Sept. 10, 1963

3,103,660
BODY SUPPORTED TIME INTERVAL INDICATOR WITH COLLAPSIBLE TIMING MEANS
George B. Ticktin, 2388 Creston Ave., Bronx, N.Y.
Filed July 14, 1959, Ser. No. 827,082
2 Claims. (Cl. 340—407)

The present invention relates to an indicator and more particularly and specifically to a habit training device in the form of a periodic or timed indicator to serve as a reminder to do or abstain from doing certain acts necessary to the formation of a desirable habit.

It is an accepted fact that human reflexes are the result of sensatory stimulus and do not involve function of the high cerebral centers. A knee reflex, for example, resulting from tapping of the femoris quadriceps muscle, is the result of such a sensatory stimulus. The repeated stimulation of a nerve circuit tends to make the circuit more proficient or responsive to stimulus, just as practice in the arts of typing or piano playing develop sensatory circuits involved to a point where the circuits are stimulated into action without conscious effort. Hence, a deliberate conscious act may, by repetition or practice, be developed into an involuntary reflex habit.

A habit is the establishment of two or more reflexes into an involuntary behavior pattern; thus, most skills become habit when proficiency of the skill is acquired through practice. For this reason new habits may be attained through practice or repetition, and undesirable habits may be broken by the development of a new, desirable habit in substitution for the undesirable habit. It is difficult to form a habit, however, without a constant reminder to act or abstain from acting, physically or mentally. With frequent reminders an individual may develop a practice pattern, which, in time, perfects the involuntary character of the desirable behavior sought to be attained habitually.

It is therefore a general object of this invention to provide an indicator which serves as a periodic, sensatory reminder to an individual which will induce the practice pattern necessary to the development of an involuntary reflex habit.

A principal object of this invention is the provision of a unique body attached indicator which will periodically function to produce a sensation of sensatory stimulus reminding the wearer to practice development of a particular act, physical or mental, incident to a reflex habit formation.

Another object of this invention resides in the provision of a small inconspicuous mechanism adapted to be worn or carried comfortably on the person which will periodically produce a sensatory stimulus to the wearer.

Still another object of this invention is the provision of a small mechanical device which is adapted to be inconspicuously carried or worn on the person and which includes a presettable timer to activate means for producing a touch or audible sensatory stimulus to the wearer.

A further object of this invention is the provision of a small self-powered mechanical indicator adapted to be inconspicuously and comfortably carried or worn on the person in the nature of a small watch case which includes an energy source and a timer mechanism to periodically activate means for producing a touch or audible sensatory stimulus to the wearer of the case.

Another object of this invention is in the provision of a small indicator mechanism adapted to be worn or attached to the body which includes mechanism for periodically activating means for producing vibratory, abrasive or audible sensation to the wearer to provide a sensatory stimulus for the development of reflex habits.

Still further objects and advantages of this invention will become more readily apparent to those skilled in the art when the following description is read in the light of the accompanying drawings.

The nature of the present invention may be described in general terms as relating to an indicator device including a casing or housing to be worn by or carried on the person, an energy source within the casing, timing means associated with the energy source and activated by said timing means.

Referring now to the accompanying drawings in which like numerals designate similar parts throughout the several views.

Figure 1:
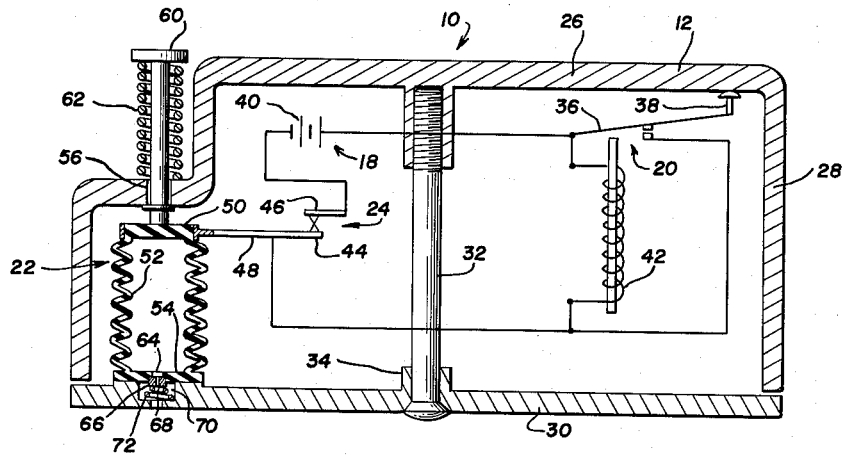
FIG. 1 is a diagrammatic view in vertical section of one form of indicator device embodying the concepts of the present invention.
Figure 3:
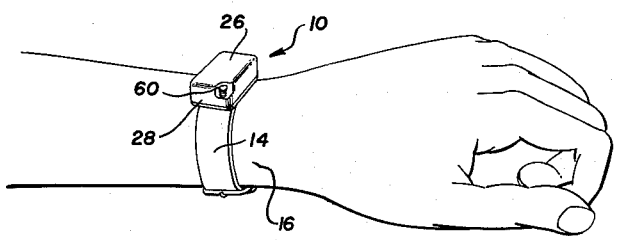
FIG. 3 is a pictorial illustration disclosing the manner of use of the indicator device when worn on the person.

In the illustrative embodiment of the present invention disclosed in FIG. 1 of the drawings there is shown an indicator device, generally designated at 10, which consists of a relatively flat casing or housing 12, within which is mounted the working mechanism of the indicator. As seen in FIG. 3 of the drawings, the casing is attached to a strap or band 14 by which it may be removably secured about the wrist 16, or ankle, of the user in the manner of a wristwatch. The indicator mechanism contained with the casing of the form of the invention illustrated in FIG. 1 consists generally of an energy source 18, a vibrator assembly 20, a timing device 22, and a switch element 24.

In more particular detail, the casing 12 is formed in the manner of a bell dome or sounding dome in that the top and side walls 26 and 28 respectively are formed integrally as a unit and such unit is spaced from the bottom wall 30 of the casing and is secured thereto by a central screw 32 engaging in a tapped boss 34 formed centrally of the upper face of the bottom casing wall. The vibrator assembly 20 includes a clapper arm 36 pivoted at one end to a fixed base and positioning the second end 38 adjacent the wall of the top unit 26 of the casing.

In the embodiment shown, an electric circuit is established in the casing which includes a battery 40, a switch 24 and an alternating armature 42 which is operably positioned in respect to the clapper arm 36. The switch 24 and clapper arm 36 are wired in series with the battery 40 and the armature 42 is connected in parallel with the clapper arm to act as an alternating make and break operator for the arm when the circuit is closed through the switch 24.

The switch 24 consists of spaced contacts 44 and 46 with contact 44 being carried on one end of an elongated arm 48, the second end of which is secured rigidly to the top wall 50 of the compressible element of the timing mechanism 22. The compressible element of the timing element consists of a tubular corrugated body 52 secured vertically on a bottom wall 54 to the inner face of the bottom wall of the casing 12 to locate the upper wall 50 of the member above the bottom wall of the casing.

The top wall 26 of the casing 12 is provided centrally above the compressible member of the timing mechanism with a circular aperture 56 through which is telescopically mounted a cylindrical stem 58 which has a button head 60 on the upper head thereof above the casing wall which seats on a coil spring 62 concentrically of the stem and resting on the upper outer face of the upper wall of the casing. The lower end of stem 58 within the casing abuts with and rests on the top wall 50 of the compressible element of the timing mechanism when such element is fully expanded vertically within the casing, in which expanded position contact 44 closes switch 24 and activates the vibrator clapper circuit.

The bottom wall 54 of the bellows-like compressible member is provided with a restricted orifice 64 centrally thereof and the bottom wall is countersunk externally concentrically about the orifice to receive a tubular washer member 66 telescopically therein which washer member is provided with a central orifice 68 of lesser diameter than orifice 64 in the bottom wall of the compressible element. The bottom wall of the casing is provided with an undercut passage 70 opening therethrough centrally beneath the compressible element of the timing mechanism and a coil spring 72 seated in the undercut portion bears upwardly against and biases washer element 66 to retain the element in the countersunk area in the bottom wall of the compressible element.

In operation of the indicator of the form disclosed in FIG. 1, the stem 58 is depressed manually by the button head 60 to compress the corrugated tubular member of the timing mechanism. Upon depression of the top wall and subsequent compression of the tubular walls of the compressible element the air contained within the element will be forced outwardly through the orifice in the bottom wall of the compressible element and will be of sufficient force to unseat the washer 66 to provide free flow of the air from within the compressible element outwardly through the undercut passage in the bottom wall of the casing. When the compressible element has been depressed to the extent of the movement of the stem 58 and then released the coil spring will reseat the washer element 66 in its countersunk base thereby restricting the in-flow of air into the compressible element to the limit permitted by the reduced diameter of the orifice in the washer member.

Thus, a metered in-flow of air from externally of the casing through the orifice of washer 66 into the compressible element will cause the element to expand in timed relationship to the in-flow of such air until the element has reached full expansion and the contact member 44 on the arm 48 has been brought into abutment with the contact 46 of switch 24 to close the circuit and activate the clapper arm to sound an audible signal by vibration against the bell casing or sounding casing head of the housing.

Thus, in timed frequency the indicator mechanism will sound a sensatory alarm which will stimulate the wearer into a reflex action in accordance with the purpose for which the indicator device is worn. By repetition of the indicator alarm through re-setting of the indicator device upon each activation thereof a reflex habit will be formed through the repetitive practice of the necessary acts incident to formation of the reflex habit.

Figure 2:
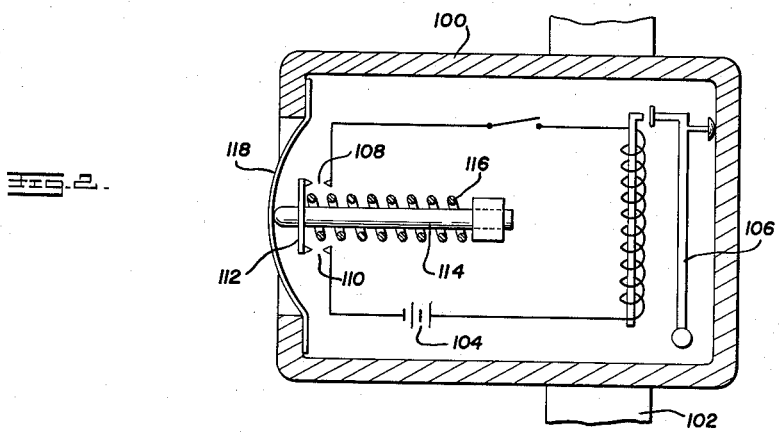
FIG. 2 is a view similar to FIG. 1 disclosing a modified form of indicator embodying the inventive concepts herein disclosed.

In FIG. 2 of the drawings there is disclosed a modified form of a habit training reminder indicator wherein the activation of the indicator is brought about by temperature changes as opposed to timed intervals as in the case of the embodiment disclosed in FIG. 1.

This modified structure includes a relatively thin housing or case 100 which is attached to a wrist or ankle bank 102 to be worn in the manner of a wristwatch. The casing is provided with an energy source 104, which for purposes of illustration only, can be considered as a mercury battery, from which an electrical circuit is established including a vibrator member 106 operating to intermittently strike the casing 100, and a switch 108 functioning to open or close the circuit from the energy source through the vibrator element.

The switch 108 consists of a pair of space dcontacts 110 and a breaker bar 112 mounted on a stem 114 which is spring seated as at 116 against a fixed abutment to normally retain the breaker bar in projected relationship away from the contacts 110. The extended end of the stem beyond the breaker bar bears against the inner face of a convex bi-metallic diaphragm 118 which is open through an aperture in the side wall of the casing to the atmosphere.

When the indicator device is worn on the person the alarm is activated when the ambient temperature reaches a predetermined degree sufficient to cause the convex diaphragm to snap inwardly of the casing depressing the stem 114 against the bias of its spring and bringing the breaker bar 112 into contact across the spaced contact points 110 closing the circuit to the vibrating striker. Activation of the vibrating striker will cause it to intermittently strike the casing wall thereby producing a sensation against the adjacent body portion of the wearer of the indicator to create a sensatory stimulus as a reminder to perform voluntarily a physical or mental act for the purpose of training the sensatory nerves to make such act an involuntary habit reflex.

It is further contemplated that the side and top walls of the casing 100 may be secured to the bottom wall in the manner hereinbefore described so that the side walls of the casing become a sounding dome or bell to produce an audible indicator as well as the vibratory sensation above referenced.

From the foregoing descriptions it is seen that within the scope of the inventive concepts hereinbefore disclosed and hereinafter claimed an automatic indicator has been provided in the nature of a body attached device which will serve at spaced in tervals of time to remind the wearer or user of the device of a voluntary reflex for the purpose of a habit formation.

Thus, having described and explained the structure and functions of the present invention and having evidenced the achievement of the objects and advantages hereinbefore set forth, what is desired to be claimed is:

1. An indicator device comprising, in combination: a casing, body engaging strap means on said casing, a power driven vibrator in said casing, a power source in said casing, and a quick-disengageable coupling between said power source and said vibrator; and a collapsible bellows connected to and engaging said coupling in the expanded position of said bellows, resilient means engaging and normally biasing said bellows to an expanded position, a return check exhaust valve and a bleeder intake valve on said bellows, and manual means for collapsing said expansible bellows expelling the air therefrom.

2. An indicator device comprising, in combination: a casing, body engaging strap means on said casing, a power driven vibrator in said casing, a power source in said casing, and a quick-disengageable coupling between said power source and said vibrator; and, a collapsible bellows connected to and engaging said coupling in the expanded position of said bellows, a return check exhaust valve and a bleeder intake valve on said bellows, a hand depressible stem for collapsing said bellows slidably mounted in said casing and engaging one end of said bellows, and a compressible spring interposed between said stem and said casing normally biasing said stem to an extended position and said bellows to an expanded position.

References Cited in the file of this patent
UNITED STATES PATENTS

| 868,621   | Zelenka    | Oct. 15, 1907 |
| 1,486,608 | Schroeder  | Mar. 11, 1924 |
| 2,447,656 | Ludwig     | Aug. 24, 1948 |
| 2,488,024 | Mudon      | Nov. 15, 1949 |
| 2,705,791 | Merancy    | Apr. 5, 1955  |
| 2,722,681 | Hersh      | Nov. 1, 1955  |
| 2,794,868 | McMorran et al. | June 14, 1957 |